(12) United States Patent
Shin et al.

(10) Patent No.: US 9,956,588 B2
(45) Date of Patent: May 1, 2018

(54) FILMS EXPRESSING METALLIC APPEARANCE USING ULTRAVIOLET CURABLE RESIN AND METHOD OF MANUFACTURING THEREOF

(71) Applicant: LG Hausys, Ltd., Seoul (KR)

(72) Inventors: Jun Beom Shin, Suwon-si (KR); Min Ho Lee, Busan (KR); Jae Bong Hwang, Busan (KR)

(73) Assignee: LG HAUSYS, LTD., Seoul (KR)

( * ) Notice: Subject to any disclaimer, the term of this patent is extended or adjusted under 35 U.S.C. 154(b) by 255 days.

(21) Appl. No.: 14/647,386

(22) PCT Filed: Jul. 18, 2013

(86) PCT No.: PCT/KR2013/006409
§ 371 (c)(1),
(2) Date: May 26, 2015

(87) PCT Pub. No.: WO2014/092274
PCT Pub. Date: Jun. 19, 2014

(65) Prior Publication Data
US 2015/0314327 A1    Nov. 5, 2015

(30) Foreign Application Priority Data

Dec. 10, 2012  (KR) .................. 10-2012-0142829

(51) Int. Cl.
*B05D 5/00* (2006.01)
*B05D 1/36* (2006.01)
(Continued)

(52) U.S. Cl.
CPC ............ *B05D 5/00* (2013.01); *B05D 1/36* (2013.01); *B05D 1/38* (2013.01); *B05D 5/068* (2013.01); *B32B 15/08* (2013.01); *B32B 27/08* (2013.01); *B32B 27/308* (2013.01); *B32B 27/32* (2013.01); *B32B 27/36* (2013.01); *B32B 27/40* (2013.01); *B32B 37/02* (2013.01); *B44B 5/0047* (2013.01); *B44F 9/10* (2013.01); *B05D 3/067* (2013.01);
(Continued)

(58) Field of Classification Search
None
See application file for complete search history.

(56) References Cited

U.S. PATENT DOCUMENTS

2003/0129385 A1* 7/2003 Hojo ................ B29C 59/046
428/323

FOREIGN PATENT DOCUMENTS

JP    H05238196 A    9/1993
JP    H0699563 A     4/1994
(Continued)

OTHER PUBLICATIONS

International Search Report for PCT/KR2013/006409 dated Oct. 10, 2013.
(Continued)

*Primary Examiner* — Michael P Rodriguez
(74) *Attorney, Agent, or Firm* — Hauptman Ham, LLP

(57) ABSTRACT

The present invention relates to a film in which a protective layer (100), a base material sheet (200), a UV-curable resin layer (300) having a concave-convex surface, a metallic layer (400), a primer layer (500), and an adhesion layer (600) are laminated in sequential order. Also, the present invention relates to a method for manufacturing said film.

12 Claims, 3 Drawing Sheets

(51) Int. Cl.

| | | |
|---|---|---|
| *B05D 1/38* | (2006.01) | |
| *B44F 9/10* | (2006.01) | |
| *B32B 15/08* | (2006.01) | |
| *B32B 37/02* | (2006.01) | |
| *B32B 27/08* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |
| *B44B 5/00* | (2006.01) | |
| *B05D 5/06* | (2006.01) | |
| *B05D 3/06* | (2006.01) | |
| *E04F 13/00* | (2006.01) | |

(52) U.S. Cl.
CPC ... *B32B 2310/0831* (2013.01); *B32B 2419/00* (2013.01); *B32B 2451/00* (2013.01); *E04F 13/002* (2013.01); *Y10T 428/24612* (2015.01)

(56) References Cited

FOREIGN PATENT DOCUMENTS

| | | |
|---|---|---|
| JP | 2007245725 A | 9/2007 |
| JP | 2007296843 A | 11/2007 |
| KR | 1020060078530 A | 7/2006 |
| KR | 1020090013509 A | 2/2009 |
| KR | 1020100123421 A | 11/2010 |
| KR | 20110019899 A * | 3/2011 |
| KR | 1020110019899 A | 3/2011 |
| KR | 20110049283 A * | 5/2011 |
| KR | 1020110049283 A | 5/2011 |
| KR | 1020110136437 A | 12/2011 |
| KR | 1182677 B1 * | 9/2012 |
| KR | 101182677 B1 | 9/2012 |

OTHER PUBLICATIONS

Japanese Office Action dated Mar. 24, 2017 in connection with the counterpart Japanese Patent Application No. 2015-546732.

\* cited by examiner

FILMS EXPRESSING METALLIC APPEARANCE USING ULTRAVIOLET CURABLE RESIN AND METHOD OF MANUFACTURING THEREOF

TECHNICAL FIELD

The present invention relates to films expressing metallic appearance using ultraviolet curable resin, and a method for manufacturing the same.

BACKGROUND ART

In interior/exterior materials for household appliances or buildings, there is strong demand for films providing a metallic visual effect for interior decoration. Although actually made of resins and thus inexpensive and easy to handle, such films appear to be made of metal, such as expensive stainless steel.

To this end, fine cracks are formed on a surface of the film, as seen on a surface of metal such as stainless steel. In addition, the film is required to have a metallic color, which seems to result, not from coatings, but from original materials.

For example, Korean Patent Publication No. 10-2006-0078530 A discloses a high gloss sheet for providing a metallic effect, which includes a PET film having hairline patterns, wherein, under the hairline patterns, a primer layer, an aluminum-deposited layer, a urethane adhesive layer, and a thermoplastic resin layer are sequentially formed.

However, in a conventional method wherein a surface of a film is scratched to form hairlines, i.e. fine cracks during passing through a sandpaper roll, although it is possible to form hairlines in a length direction of the film, i.e. in a longitudinal direction, hairlines are difficult to form in a width direction of the film, i.e. in a transverse direction. Thus, the film has only vertical hairlines, thereby making it difficult to realize natural-looking patterns as in metal.

Through studies aimed at providing a more natural metallic appearance, the inventors found that a film having a realistic metallic appearance can be manufactured using inventive embossing rolls, and completed the present invention.

DISCLOSURE

Technical Problem

It is an aspect of the present invention to provide a method for manufacturing a film having a metallic appearance.

Technical Solution

In accordance with one aspect of the present invention, there is provided a method for manufacturing a film, which includes: preparing a base sheet 200; forming a UV-curable resin layer 300 having a convex-concave pattern on a surface thereof on a lower surface of the base sheet 200; forming a metal layer 400 on a lower surface of the UV-curable resin layer 300; forming a primer layer 500 on a lower surface of the metal layer 400; and forming an adhesive layer 600 on a lower surface of the primer layer 500.

In accordance with another aspect of the present invention, there is provided a film including: a protective layer 100; a base sheet 200; a UV-curable resin layer 300 having a convex-concave pattern on a surface thereof; a metal layer 400; a primer layer 500; and an adhesive layer 600 sequentially stacked in this order.

Advantageous Effects

A film manufactured by the method according to the present invention has fine, smooth lines on a surface thereof, and thus appears to be made of metal. In addition, the method according to the present invention makes it possible to form transverselines on the surface of the film.

BEST MODE

Figure 1:
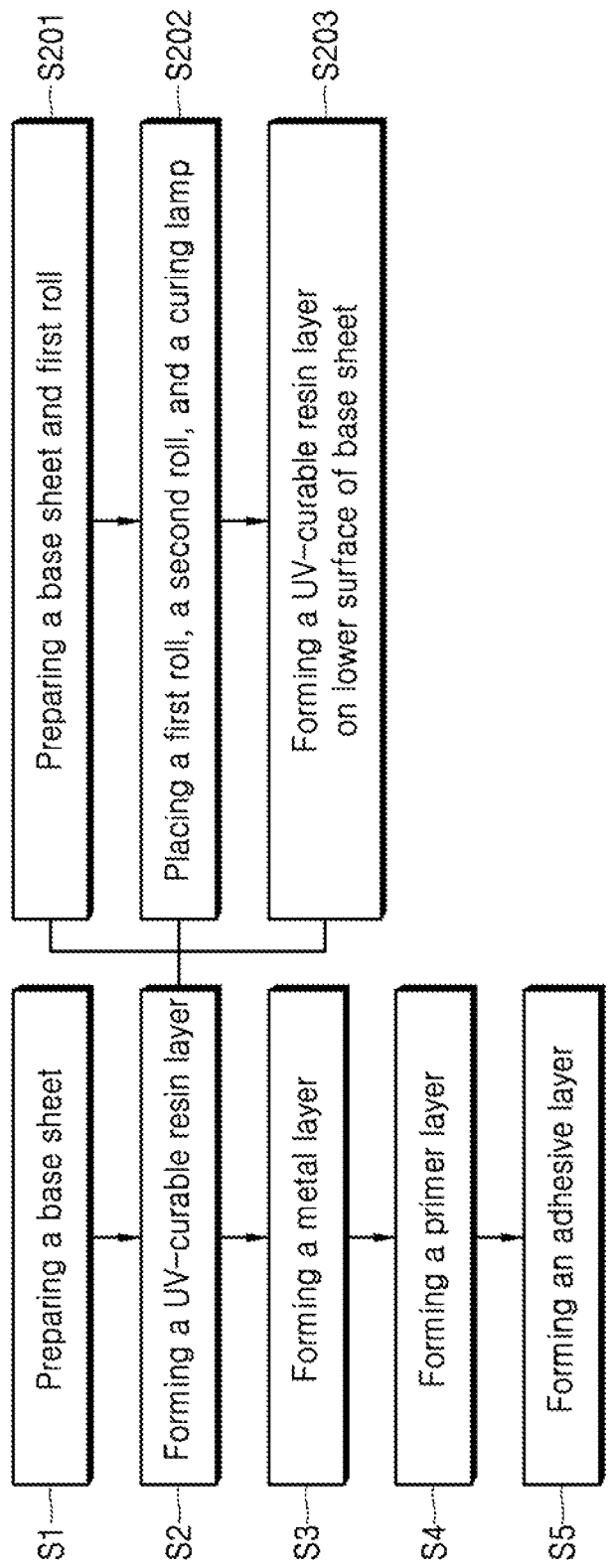
FIG. 1 is a flowchart illustrating a method for manufacturing the film according to the present invention.

The present invention relates to a method for manufacturing a film, which includes: preparing a base sheet 200; forming a UV-curable resin layer 300 having a convex-concave pattern on a surface thereof on a lower surface of the base sheet 200; forming a metal layer 400 on a lower surface of the UV-curable resin layer 300; forming a primer layer 500 on a lower surface of the metal layer 400; and forming an adhesive layer 600 on a lower surface of the primer layer 500 (see FIG. 1).

Figure 2:
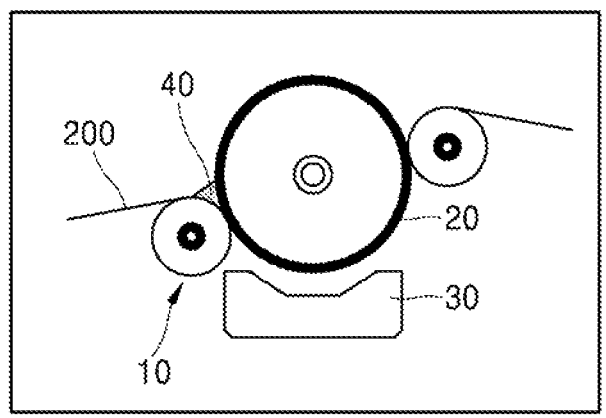
FIG. 2 is a diagram showing a method of preparing a base film with a UV-curable resin layer 300 stacked thereon.

Here, forming a UV-curable resin layer 300 may include: preparing a first roll 10 with the base sheet 200 placed on a surface thereof; placing the first roll 10 adjacent to a second roll 20 having a convex-concave pattern on a surface thereof so as to have a gap therebetween and placing a curing lamp 30 near them; supplying a UV-curable resin to the gap between the first roll 10 and the second roll 20 and transferring the convex-concave pattern of the second roll 20 to the UV-curable resin by rotating at least one of the first roll 10 and the second roll 20 (see FIG. 2).

Figure 3:
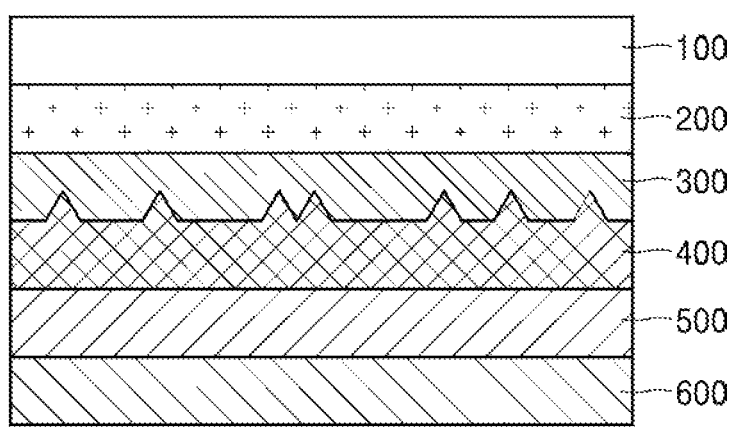
FIG. 3 is a side-sectional view of the film according to the present invention.
Figure 4:
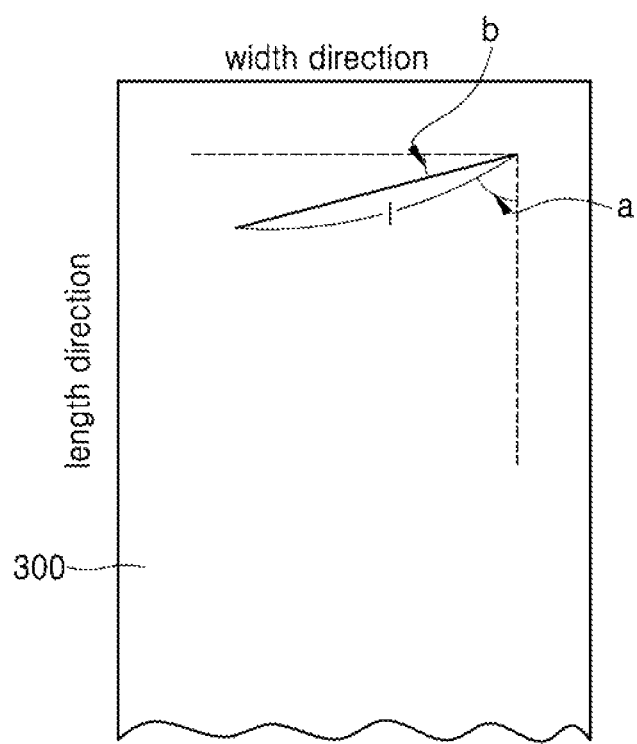
FIG. 4 shows a depression formed on a surface of the UV-curable resin layer 300 of the film according to the present invention.

In addition, the present invention relates to a film wherein a protective layer 100; a base sheet 200; a UV-curable resin layer 300 having a convex-concave pattern on a surface thereof; a metal layer 400; a primer layer 500; and an adhesive layer 600 are sequentially stacked in this order (see FIG. 3).

MODE FOR INVENTION

Hereinafter, the present invention will be described in detail.

Preparation of Base Sheet 200 (S1)

The base sheet 200 may include thermally formable polyester resins, acrylic resins, urethane reins, or olefin resins. Preferably, the base sheet includes polyester resins such as polyalkylene terephtalate resins, more preferably polyethylene terephthalate resins or polybutylene terephthalate resins.

The base sheet 200 has a haze of less than 10%. If the haze of the base sheet 200 is greater than 10%, the metal layer 400 is not clearly visible from the outside of the film, thereby causing deterioration in metallic appearance of the film.

The base sheet 200 has a thickness of 20 μm to 50 μm. If the thickness of the base sheet 200 is less than 20 μm, there is a high probability that the base sheet 200 cannot support the UV-curable resin layer 300, thereby causing damage to the film's shape. In addition, if the thickness of the base sheet 200 is greater than 50 μm, characteristics of the metal layer 400 cannot be sufficiently seen from the outside of the film.

Formation of UV-Curable Resin Layer 300 (S2)

Formation of UV-Curable Resin Layer 300

The UV-curable resin layer 300 may be formed using a UV-curable resin composition composed of a urethane or acrylic monomer, an oligomer thereof, a photoinitiator, and additives for supplementing properties.

The acrylic monomer may include $C_1$ to $C_{12}$ alkyl group-containing acrylates or urethane acrylates. For example, the acrylic monomer may be butyl acrylate, hexyl acrylate, n-octyl acrylate, isooctyl acrylate, 2-ethylhexyl acrylate, isononyl acrylate, or other (meth)acrylate monomers, without being limited thereto.

The photoinitiator may include radical initiators well-known in the art, such as 2,2'-azobisisobutyronitrile (AIBN), and benzoyl peroxide (BPO), without being limited thereto.

As the composition for the UV-curable resin layer 300, a resin composition having a solid content of 30 wt % to 100 wt % may be used. Preferably, a solvent-free resin composition having a solid content of 100 wt % is used so as to form the same convex-concave pattern as the convex-concave pattern formed on a mold, such as an embossing roll. If the solid content of the composition is less than 30 wt %, the UV-curable resin layer 300 cannot be efficiently formed due to low adhesion of the resin composition to the embossing roll.

Method of Forming UV-Curable Resin Layer 300

The UV-curable resin layer 300 is formed by a method including: preparing a first roll 10 with the base sheet 200 placed on a surface thereof (S201); placing the first roll 10 adjacent to a second roll 20 having a convex-concave pattern on a surface thereof to have a gap therebetween and placing a curing lamp 30 near them (S202); supplying a UV-curable resin to the gap between the first roll 10 and the second roll 20 and transferring the convex-concave pattern of the second roll 20 to the UV-curable resin by rotating at least one of the first roll 10 and the second roll 20 (S203).

The step of preparing a first roll 10 with the base sheet 200 placed on a surface thereof (S201) is an operation of placing the base sheet 200 on all or part of the surface of the first roll 10. Typically, the base sheet 200 is partially wound on the first roll 10, and then the rest of the base sheet 200 is drawn toward the first roll 10, as the first roll 10 rotates.

The step of placing the first roll 10 adjacent to the second roll 20 having a convex-concave pattern on a surface thereof to have a gap therebetween and placing a curing lamp 30 them (S202) is a pre-operation for forming a convex-concave pattern on a surface of the UV-curable resin while curing the resin. Here, the first roll 10 is placed so as not to adjoin the second roll 20 such that the UV-curable resin can be supplied to the gap between the first roll 10 and the second roll 20. Thus, the distance between the first roll 10 and the second roll 20 depends on a desired thickness of the UV-curable resin layer 300, and may be adjusted by those skilled in the art, as needed. The second roll has a convex-concave pattern on a surface thereof, which serves to form a reverse pattern thereof on the UV-curable resin layer 300. That is, a depression can be formed in the UV-curable resin layer 300 corresponding to a protrusion of the second roll 20.

The convex-concave pattern on the surface of the second roll 20 has depressions and protrusions, wherein the protrusions have a smaller area than the depressions and have a height of 0.3 μm to 0.7 μm.

The curing lamp 30 is a UV lamp for curing the UV-curable resin supplied to the gap between the first roll 10 and the second roll 20. The curing lamp 30 is placed near the first and second rolls 10, 20 and is preferably placed in a direction opposite a feeding direction of the UV-curable resin 40 with respect to the first roll 10 or the second roll 20.

The step of supplying the UV-curable resin 40 to the gap between the first roll 10 and the second roll 20 and transferring the convex-concave pattern of the second roll 20 to the UV-curable resin by rotating at least one of the first roll 10 and the second roll 20 (S203) is an operation of preparing the base sheet 200 on which the UV-curable resin layer 300 having a convex-concave pattern on the surface thereof is stacked. In this operation (S203), when the supplied UV-curable resin passes through the gap between the first roll 10 and the second roll 20, the UV-curable resin is stacked on the base sheet 200 while the convex-concave pattern is transferred to the surface of the UV-curable resin and cured. In other words, transfer of the convex-concave pattern from the second roll 20 to the UV-curable resin and formation of the UV-curable resin layer 300 on the base sheet 200 are carried out at the same time. Preferably, both the first roll 10 and the second roll 20 are rotated.

The step of forming a UV-curable resin layer 300 (S2) may further include secondarily curing the base sheet 200 with the UV-curable resin layer 300 stacked thereon using a separate curing lamp (S204), wherein the base sheet has been prepared in the step of transferring the convex-concave pattern of the second roll 20 to the UV-curable resin (S203). The secondary curing step (S204) allows the UV-curable resin layer to exhibit more stable properties.

UV-Curable Resin Layer 300

Preferably, the UV-curable resin layer 300 has a thickness of 10 μm to 30 μm. If the thickness of the UV-curable resin layer 300 is less than 10 μm, there can be a problem of deterioration in adhesion between the UV-curable resin layer 300 and the base sheet 200. In addition, if the thickness of the UV-curable resin layer 300 is greater than 30 μm, characteristics of the metal layer 400 under the UV-curable resin layer cannot be sufficiently seen from the outside of the film.

The UV-curable resin layer 300 has a haze of less than 10%. If the haze of the UV-curable resin layer 300 is greater than 10%, the film can be deteriorated in metallic appearance characteristics, since the metal layer 400 is not clearly visible from the outside of the film.

The UV-curable resin layer 300 has a convex-concave pattern on the surface thereof, wherein the convex-concave pattern is a reverse pattern corresponding to the convex-concave pattern of the second roll 20. The convex-concave pattern of the UV-curable resin layer 300 is located on a side opposite to the base sheet 200.

The convex-concave pattern formed on the surface of the UV-curable resin layer 300 includes protrusions and depressions, wherein the depressions have a smaller area than the protrusions and have a depth of 0.3 μm to 0.7 μm. If the depth of the depressions is less than 0.3 μm, fine cracks as observed on a metal surface do not clearly appear, thereby making it difficult to realize a desired metallic effect of the present invention. In addition, if the depth of the depressions is greater than 0.7 μm, it is difficult to secure the metallic effect due to reduction in similarity to typical fine cracks of a metal surface, i.e. hairlines.

The UV-curable resin layer 300 includes a depression satisfying Equation 1 on the surface thereof. This is because film width-wise lines (depressions), i.e. horizontal lines, can be formed on the surface of the UV-curable resin layer 300 by the method according to the invention.

$$a > b \qquad \text{<Equation 1>}$$

a: an angle defined between a long direction (l) of the depression and a length direction of the film, and b: an angle defined between a long direction (l) of the depression and a width direction of the film.

Formation of Metal Layer 400 (S3)

The metal layer 400 is formed by depositing a metal component on the lower surface of the UV-curable resin layer 300. The metal layer 400 may be formed by typical vacuum thermal evaporation, sputtering, or the like. For example, in vacuum thermal evaporation, vacuum evaporation may be performed at a pressure of $10^{-4}$ to $10^{-6}$ torr and at a temperature of 300° C. to 800° C., and, in sputtering, the metal component is subdivided into fine metal nanoparticles in plasma and coated onto the lower surface of the UV-curable resin layer 300, thereby forming a metal layer to a thickness of 0.70 OD (optical density), without being limited thereto. The metal may include gold, silver, cobalt, aluminum, iron, nickel, chromium, copper, tin, stainless steel, and the like. Preferably, the metal includes aluminum, without being limited thereto. It should be understood by those skilled in the art that the metal layer 400 may be formed using any metal suitable to realize desired metallic effects.

The metal layer 400 is visually perceived from the outside of the film through the UV-curable resin layer 300 and the base sheet 200. The metal layer 400 allows the film to have more realistic metallic effects and to exhibit metallic colors.

The metal layer 400 has a thickness of 100 nm to 1000 nm. If the thickness of the metal layer 400 is less than 100 nm, metallic effects are difficult to perceive from the outside of the film, and if the thickness of the metal layer 400 is greater than 1000 nm, unnecessary cost increase can be caused.

The metal layer 400 may be a monolayer metal film or a multilayer metal film. However, a metal film wherein several metal layers are stacked one above another has an advantage in realization of metallic effects with various colors and high brightness as compared with a monolayer metal film.

Formation of Primer Layer 500 (S4)

The primer layer 500 is interposed between the metal layer 400 and the adhesive layer 600, and serves to increase adhesion of the metal layer 400 to the adhesive layer 600. The primer layer 500 may include acrylic resins, acrylic urethane resins, epoxy resins, polyurethane resins, polyisocyanate resins, polyester resins, acrylate resins, ethylene-vinylacetate copolymers, polyamide resins, melamine resins, synthetic rubber resins, polyvinyl alcohol resins, and the like. The primer layer 500 may be formed on the lower surface of the metal layer 400 using any typical method known in the art, for example, by gravure coating. As used herein, the term "lower surface of the metal layer 400" refers to a side of the metal layer 400 opposite to the UV-curable resin layer 300.

The thickness of the primer layer 500 may be adjusted by varying viscosity of the resin in solution. Preferably, the primer layer has a thickness of 1 μm to 5 μm. When the thickness of the primer layer 500 ranges from 1 μm to 5 μm, it is possible to sufficiently enhance adhesion between the metal layer 400 and the adhesive layer 600 while avoiding unnecessary increase in thickness of the film.

Formation of Adhesive Layer 600 (S5)

The adhesive layer 600 is formed on the lower surface of the primer layer 500. The adhesive layer 600 serves to bond the film to an adherend. The adherend may be a surface of a plate of an electronic product, and the like.

The adhesive layer 600 may be formed by depositing an adhesive such as polyurethane or polyester to a thickness of 5 μm to 10 μm through comma coating. When the adhesive layer is formed as an opaque layer, it is possible to realize a clearer three-dimensional effect. Alternatively, the adhesive layer 600 may be formed through micro-gravure coating. When the adhesive layer 600 is formed as an opaque layer, a pigment may be added to an adhesive composition for the adhesive layer 600.

Film

The film has a structure wherein the protective layer 100; the base sheet 200; the UV-curable resin layer 300 having a convex-concave pattern on a surface thereof; the metal layer 400; the primer layer 500; and the adhesive layer 600 are sequentially stacked in this order. The film may be used as interior films, decorative films, and the like. In use, the film is attached to surfaces of electronics, furniture, interior/exterior materials for indoor/outdoor decoration, and the like. The film allows these articles to appear to be made of metal.

Protective Layer 100

The film may include the protective layer 100 on an upper surface of the base sheet 200 to protect a surface of the film from the surrounding environment. The protective layer 100 may be formed of acrylic resins, acrylic urethane resins, epoxy resins, polyurethane resins, polyisocyanate resins, polyester resins, acrylate resins, ethylene-vinylacetate copolymers, polyamide resins, melamine resins, synthetic rubber resins, polyvinyl alcohol resins, and the like. Preferably, the protective layer 100 has a thickness of 10 μm to 30 μm.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the present invention by those skilled in the art. The scope of the invention is defined only by the claims. Like components will be denoted by like reference numerals throughout the specification.

EXAMPLE 1

A 30 μm thick high transparent PET sheet having a haze of 6%, a light transmittance of 92% or higher and a gloss of 160% was prepared, followed by disposing the PET sheet on a first roll. Next, an acrylate resin composition having a solid content of 70% including 10 parts by weight of 2,2'-azobisisobutyronitrile (AIBN) based on 100 parts by weight of urethane acrylate was prepared as a UV-curable resin coating solution. The first roll was placed near a second roll, which includes protrusions having a height of about 0.5 μm on a surface thereof, and a UV curing lamp was placed near them. The UV-curable resin coating solution was supplied to a gap between the first roll and the second roll, while curing the resin solution using a UV curing lamp. Next, the cured UV-curable resin was cured again using a separate UV lamp, thereby forming a UV-curable resin layer having a convex-concave pattern on a surface thereof on a lower surface of the base sheet. The UV-curable resin layer had a thickness of 20 μm, and depressions were formed on the surface of the UV-curable resin layer along the length-wise of the film. After sufficient drying, an aluminum-deposited layer was formed to a thickness of 600 μm on a lower surface of the UV-curable resin layer at $10^{-4}$ torr at 760° C. through vacuum evaporation. Here, the convex-concave pattern of the UV-curable resin layer was brought into contact with the aluminum-deposited layer. Next, an acrylate resin was coated onto a lower surface of the aluminum-deposited layer though gravure coating, thereby forming a 4 μm thick primer layer. Thereafter, a polyester adhesive layer was formed to a thickness of 10 μm on a lower surface of the primer layer through comma coating, thereby preparing a film according to the present invention.

EXAMPLE 2

In the film of Example 1, an acrylic resin was coated onto an upper surface of the base sheet to form a 20 μm protective layer, thereby manufacturing a film.

In the films of Examples 1 to 2, long fine cracks (depressions) was formed in the width direction of the film as well as in the length direction thereof, and colors of the metal layer appeared on the outside, whereby the films made of resins appeared to be made of stainless steel.

LIST OF REFERENCE NUMERALS

10: First roll
20: Second roll
30: UV curing lamp
40: UV-curable resin
100: Protective layer
200: Base sheet
300: UV-curable resin layer
400: Metal layer
500: Primer layer
600: Adhesive layer

INDUSTRIAL APPLICABILITY

The present invention relates to an interior film which provides a metallic visual effect using a UV-curable resin, and a method for manufacturing the same.

The invention claimed is:
1. A method for manufacturing an interior film for providing a metallic appearance, the method comprises:
preparing a base sheet;
forming a UV-curable resin layer on a lower surface of the base sheet, wherein the UV-curable resin layer has hairlines on a surface thereof, the hairlines have a depth ranging from 0.3 μm to 0.7 μm, and the hairlines comprise:
hairlines extending in a length direction of the film;
hairlines extending in a width direction of the film, wherein the hairlines extending in the width direction of the film satisfy Equation 1:

$a > b$      <Equation 1> a: an angle defined between a length direction (l) of the hairlines extending in the width direction of the film and a length direction of the film, and
b: an angle defined between the length direction (l) of the hairlines extending in the width direction of the film and a width direction of the film;
forming a metal layer on a lower surface of the UV-curable resin layer;
forming a primer layer on a lower surface of the metal layer;
forming an adhesive layer on a lower surface of the primer layer; and
forming a protective layer on an upper surface of the base sheet,
wherein forming the UV-curable resin layer comprises:
preparing a first roll with the base sheet placed on a surface thereof;
placing the first roll adjacent to a second roll having a convex-concave pattern on a surface thereof to form a gap between the first roll and the second roll, and placing a curing lamp in proximity to the first roll and the second roll; and
supplying a UV-curable resin to the gap between the first roll and the second roll and rotating at least one of the first roll or the second roll to form the UV-curable resin layer having the hairlines on the surface thereof.

2. The method according to claim 1, wherein the base sheet has a thickness of 20 μm to 50 μm.

3. The method according to claim 1, wherein the base sheet comprises polyester resins, acrylic resins, urethane reins, or olefin resins.

4. The method according to claim 1, wherein the UV-curable resin layer has a thickness of 10 μm to 30 μm.

5. The method according to claim 1, wherein the UV-curable resin layer is formed of a $C_1$ to $C_{12}$ alkyl group-containing acrylate or a urethane acrylate.

6. The method according to claim 1, wherein the hairlines of the UV-curable resin layer is located on a side opposite to the base sheet.

7. The method according to claim 1, wherein the protective layer has a thickness of 10 μm to 30 μm.

8. The method according to claim 1, wherein the base sheet is placed on all or part of a surface of the first roll.

9. The method according to claim 1, wherein the curing lamp is placed in a direction opposite a feeding direction of the UV-curable resin with respect to the first or second roll.

10. The method according to claim 1, wherein the convex-concave pattern of the second roll is transferred to the UV-curable resin to form the hairlines, and the UV-curable resin layer is formed on the lower surface of the base sheet at the same time.

11. The method according to claim 1, wherein protrusions of the convex-concave pattern of the second roll have a height of 0.3 μm to 0.7 μm.

12. The method according to claim 1, wherein protrusions formed on the surface of the second roll have a smaller area than depressions formed thereon.

* * * * *